United States Patent [19]

Etchu et al.

[11] 4,129,630

[45] Dec. 12, 1978

[54] PROCESS FOR PRODUCING THERMOPLASTIC RESIN FILMS HAVING REDUCED THICKNESS UNEVENNESS

[75] Inventors: Masami Etchu; Takao Yamaguchi; Norio Takagi, all of Ogaki, Japan

[73] Assignee: Teijin Limited, Osaka, Japan

[21] Appl. No.: 671,380

[22] Filed: Mar. 29, 1976

[30] Foreign Application Priority Data

Apr. 1, 1975 [JP] Japan .................................. 50-38588

[51] Int. Cl.² .............................................. B29F 3/08
[52] U.S. Cl. ........................................ 264/22; 264/216
[58] Field of Search .................................. 214/22, 216; 425/174.8 E, 135, 377; 226/94

[56] References Cited

U.S. PATENT DOCUMENTS

| | | | |
|---|---|---|---|
| 3,655,307 | 4/1972 | Hawkins | 425/174.8 E |
| 3,660,549 | 5/1972 | Hawkins | 425/174.8 E |
| 3,686,374 | 8/1972 | Hawkins | 425/174.8 E |
| 3,758,251 | 9/1973 | Gillyns et al. | 264/22 |
| 3,779,682 | 12/1973 | Huskey et al. | 264/22 |
| 3,795,474 | 3/1974 | Heyer | 264/216 |
| 3,820,929 | 6/1974 | Busby et al. | 425/174.8 E |
| 3,883,279 | 5/1975 | Heyer | 264/40.6 |
| 3,904,725 | 9/1975 | Huskey et al. | 264/216 |

Primary Examiner—Jay H. Woo
Attorney, Agent, or Firm—Sherman & Shalloway

[57] ABSTRACT

A process for producing a film of reduced thickness unevenness which comprises extruding a thermoplastic resin from an extrusion die into a film form, exposing the extrudate to an electric field induced by an electrostaticity applying electrode, and then pinning it to the surface of a cooling drum, wherein a shielding object is disposed between the extrusion surface of the die and the electrostaticity applying electrode thereby to maintain the applied voltage constant in the widthwise direction of the extrudate and to enable the extrudate to adhere intimately to the surface of the cooling drum, and an apparatus for producing a film of reduced thickness unevenness comprising an extrusion die equipped with means for adjusting the thickness unevenness of the film by temperature control, an electrode for applying electrostaticity, a cooling drum and a shielding object, said shielding object being a conductive object, a non-conductive object or a combination of these, and being disposed between the extrusion surface of the die and the electrostaticity applying electrode.

6 Claims, 1 Drawing Figure

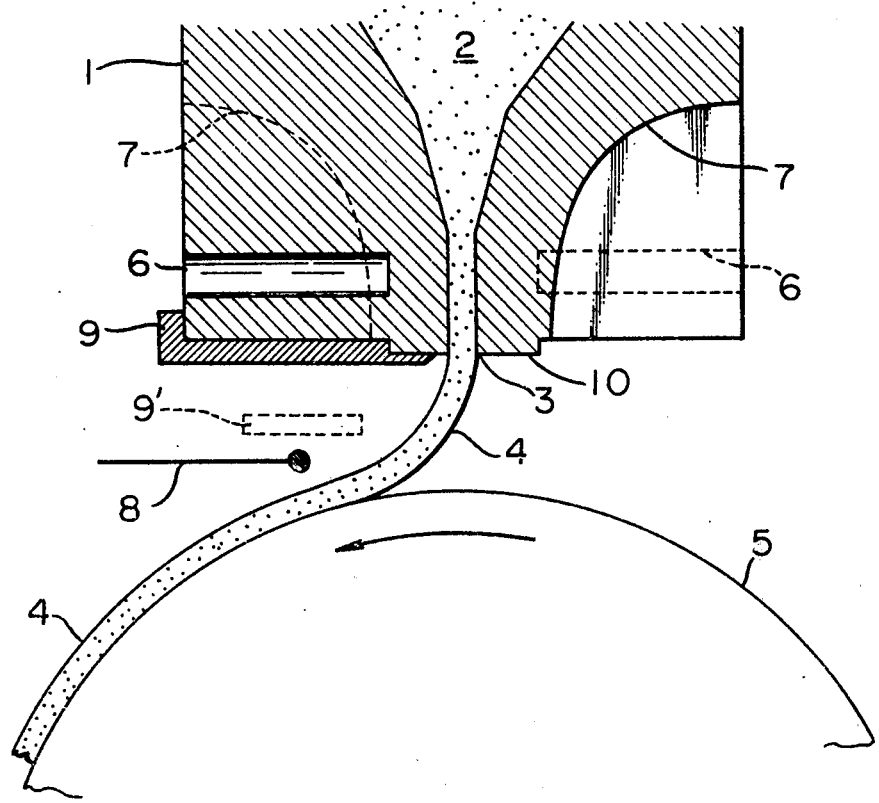

PROCESS FOR PRODUCING THERMOPLASTIC RESIN FILMS HAVING REDUCED THICKNESS UNEVENNESS

This invention relates to a process and an apparatus for producing thermoplastic resin films having reduced thickness unevenness.

A technique is known from U.S. Pat. No. 3,102,302 which comprises applying an electrostatic charge to a molten or uncoagulated film as extruded from an extrusion die and adhering it intimately to the surface of a cooling drum by the electrostatic force thereby to quench the film uniformly over its entire width. In this prior art technique, a wire electrode for corona discharge is provided near the surface of the cooling drum in parallel to the axis of the cooling drum, and the film is passed between the electrode and the cooling drum.

In order to obtain a film having uniform thickness, the portion of contact between the film and the cooling drum needs to be parallel to the axis of the cooling drum and be situated in a straight line in the widthwise direction of the film. Furthermore, in order to maintain the film cooling conditions constant and invariable, it is necessary to maintain the charged voltage constant in the widthwise direction of the film. The present-day techniques, however, fail to ensure a uniform discharge condition. If a foreign matter adheres to a part of the wire electrode, the film cooling conditions at that part of the film which corresponds to the adhering portion vary to cause thickness unevenness in the longitudinal direction of the advancing film, which, in turn, naturally impairs its thickness uniformity in the widthwise direction. In many cases, the foreign matter on the electrode consists of low-molecular-weight compounds, additives, etc. which have sublimed from the surface of the molten film and thus adhered to the electrode. Since such a foreign matter adheres nonuniformly to the electrode, the pinning effect becomes non-uniform to cause thickness unevenness to the film. For this reason, the wire electrode is carefully cleaned prior to use, and exchanged when the adhesion of the foreign matter becomes remarkable to cause a failure of normal production.

In addition, extrusion dies in common use include metallic bolts provided at intervals in the widthwise direction of the die in order to adjust the thickness of the film in the widthwise direction. The provision of these bolts renders the electrostatic field nonuniform, and becomes a cause of inducing thickness unevenness of the film.

Accordingly, it is an object of this invention to provide a technique of producing thermoplastic resin films of reduced thickness unevenness as a result of preventing the electrostatic field from becoming nonuniform.

It has been found that this object can be achieved by shielding the electrode from the extrusion surface of the die (in other words, by shielding the extrusion surface of the die from the electrode).

Thus, according to this invention, there is provided a process for producing a film of reduced thickness unevenness which comprises extruding a thermoplastic resin from an extrusion die into a film form, exposing the extrudate to an electric field induced by an electrostaticity applying electrode, and then pinning it to the surface of a cooling drum, wherein a shielding object is disposed between the extrusion surface of the die and the electrostaticity applying electrode thereby to maintain the applied voltage constant in the widthwise direction of the extrudate and to enable the extrudate to adhere intimately to the surface of the cooling drum.

The invention also provides an apparatus for producing a film of reduced thickness unevenness in accordance with the above process, said apparatus comprising an extrusion die equipped with means for adjusting the thickness unevenness of the film by temperature control, an electrode for applying electrostaticity, a cooling drum and a shielding object, said shielding object being a conductive object, a non-conductive object or a combination of these, and being disposed between the extrusion surface of the die and the electrostaticity applying electrode.

The present invention can be broadly applied to the production of films composed of known thermoplastic resins such as polyamide resins, polyester resins, polyolefin resins and polyvinyl resins, either as homopolymers or copolymers, or as blends of these polymers. These films can of course contain pigments, additives, lubricants, and nucleating agents.

Extrusion dies of the type in which the die lip clearance is adjusted by bolts, and those of the type in which auxiliary heaters (cartridge heaters) are provided at the sides of the extrusion die to control the thickness of the film in the widthwise direction of the die (the widthwise direction of the film) can both be used in the present invention.

Corona discharge treatment is one known method for applying an electrostatic charge to the film, and this known method can be employed in the present invention. Generally, the electrode is a wire electrode extending in a straight line in the widthwise direction of the film. There can also be used an electrode which is adapted to perform corona discharge partly in the width-wise direction of the film.

The most important feature of the present invention is that the shielding object is provided between the extrusion surface of the die and the electrode and in this state, the film is subjected to a corona discharge treatment. This shielding object serves to prevent the shortening of the service life of the electrode which is caused as a result of the adhesion to the electrode of sublimable low-molecular-weight compounds, additives and other foreign matter that are discharged together with the film extruded from the extrusion die. It also serves to enable the electrode to form a stable electric field. Desirably, therefore, the extrusion surface of the die is shielded from the electrode by the shielding object as broadly as possible so long as it does not adversely affect the formation of the film. The contamination of the electrode can be prevented more effectively by shielding the vicinity of the electrode by the shielding object.

The shape of the shielding object may be a planar or curved surface or a combination of these selected according to the shape of the extrusion surface of the die. When there is a sufficient gap between the extrusion die and the cooling drum and both the electrode and the shielding object can be placed in this gap, the shielding object may either be a conductive object (e.g., metals and conductive fibers) or a non-conductive object (e.g., thermally stable materials such as ceramics or glass). When the shielding object and the electrode are in contact with each other or very close to each other, it is necessary that the shielding object should be made of a non-conductive object or a combination of it with a conductive object.

A preferred embodiment of this invention is described below with reference to the accompanying drawing which is a view in vertical section of an apparatus suitable for performing the process of this invention.

A molten resin is extruded from a die lip 3 through a manifold 2 inside a die 1, and quenched and solidified as a film 4 on a cooling drum 5. At this time, the film 4 is subjected to a corona discharge treatment by an electrostaticity applying electrode 8 provided between the extrusion die 1 and the cooling drum 5. Consequently, the film 4 becomes charged and pinned onto the surface of the cooling drum 5 in the state of intimate adhesion. A shielding object 9 is secured to a part or the whole of an extrusion surface 10 of the die 1 to shield the electrode 8 from the extrusion surface 10 of the die 1. Accordingly, the extrusion lip 3 and the sublimation products, additives and other matters generated from the film 4 at high temperatures do not contaminate the electrode 8. The shield object may be disposed at a position in contact with the extrusion surface 10 as shown at 9 in the drawing, or at a position not in contact with the extrusion surface 10 as shown in 9' in the drawing. It is only necessary that the shielding object 9 or 9' should be interposed between the extrusion surface 10 of the die 1 and the electrode 8 to shield the electrode 8 from the extrusion surface 10.

The shielding object 9 or 9' may be of various shapes, and can take any desired linear or planar shape, such as rods, sheets or nets, so long as such a shape does not adversely affect the extrusion of the film 4 and its casting onto the cooling drum.

The material of the shielding object 9 or 9' may generally be a conductor such as metal. But as stated hereinabove, when it makes contact with the electrode 8 or is very close to it, a non-conductor or a combination of it with a conductor should be used. When film formation is effected at high speeds, the distance between the extrusion surface of the die and the cooling drum needs to be shortened. In such a case, too, a shielding object consisting of a non-conductor and a conductor should be used. The non-conductor may, for example, be ceramics, glass, and other inorganic materials. Needless to say, these non-conductive materials are required to have some level of thermal stability and durability. Desirably, such a shielding object is provided so that it can be easily installed and removed. This has the advantage that the exchange and periodical cleaning of the shielding object become easy.

In the apparatus shown in the accompanying drawing, a number of cartridge heaters 6 are provided on both sides of the die 1. By operating some of these heaters at right times to change the flow amount of the molten resin locally, films having a uniform thickness can be obtained. The die 1 further includes slits 7 so as to make the temperature control of the cartridge heaters more effective. Since the slits 7 regulate the heat transmission in the widthwise direction of the die, this die easily permits the independent temperature control of the cartridge heaters.

As a result of using a die of the above-described structure, the present invention brings about the following technical advantages.

(1) The local contamination of the electrostaticity applying electrode in the vicinity of the extrusion lip (extrusion surface) is prevented, and films having uniform properties and uniform thickness can be obtained.

(2) It is scarcely necessary to exchange the electrode, and therefore, the rate of operation increases.

(3) The electric field density becomes uniform, and films of high quality can be obtained.

(4) As an unexpected advantage, the pinning effect increases even when the voltage applied is low.

(5) Since pinning can be performed stably, films can be produced stably.

(6) Since the effect of controlling thickness unevenness in the widthwise direction of the film by cartridge heaters and other means is coupled with the complete pinning effect obtained by shielding, films of very uniform quality can be obtained.

The following non-limitative examples illustrate the present invention specifically.

EXAMPLE 1

Using an extrusion die of the type described in U.S. Pat. No. 3,819,775, that is, an extrusion die having a die width of 760 mm and a die lip clearance of 15 mm and including a number of cartridge heaters each of which can perform temperature adjustment over a width of 40 mm and a number of slits each with a width of 5 mm on both sides, ordinary polyethylene terephthalate was melt-extruded at 275° C. at an extrusion rate of 200 Kg/hour. The extrudate was then stretched 3.6× both in the longitudinal and transverse directions and heatset by a known procedure to form a biaxially oriented film having a thickness of 12 microns.

In this process, the temperature of the cooling drum was set at 35° C., and the distance between the die extrusion surface and the cooling drum was adjusted to 25 mm. A wire electrode for applying electrostaticity of the type shown in Japanese Patent Publication No. 6142/72 was stretched taut in a space between the die extrusion surface and the cooling drum at a position 5 mm away from the surface of the cooling drum, and a voltage of 6.0 KV was applied thereto. A flat steel panel having a thickness of 2 mm was used as a shielding object and bonded to the extrusion surface of the die facing the wire electrode.

The film production was performed for 3 days under the above conditions, and the results obtained are shown in the following table.

EXAMPLE 2

Using an extrusion die of an ordinary type having a die width of 410 mm, and a die lip clearance of 1.5 mm and including adjusting bolts spaced at intervals of 40 mm (this type of extrusion die is known to be liable to cause thickness unevenness in the widthwise direction of the film because it includes a device for clamping the die lip to the body of the die), the following operation was performed. The adjustment of thickness unevenness was performed by local adjustment of the die slit clearance using the adjusting bolts.

A molten polyester was extruded at an extrusion rate of 15 Kg/hour to form an unstretched sheet having a thickness of 160 microns, and then stretched biaxially to form a polyester film having a thickness of 12 microns in a customary manner. The temperature of the cooling drum was 45° C. The distance between the extrusion surface of the die and the drum was adjusted to 30 mm, and the distance between the wire electrode and the drum was 5 mm. The voltage applied was 5.5 KV. The shielding object used was a 3 mm-diameter copper wire covered with a polytetrafluoroethylene tube with a diameter of 5 mm, which was secured to the raised and depressed portion present on the die extrusion surface which was nearest to the wire electrode. The copper wire was electrically connected to the extrusion die, and grounded.

The film production was performed for 3 days under the above conditions, and the results obtained are shown in the following table.

EXAMPLE 3

Using the same apparatus as used in Example 1, a polyester film having a thickness of 23 microns was produced under the same operating conditions as in Example 1 except that the extrusion amount of the molten resin was changed to 400 Kg/hour. The distance between the die extrusion surface and the cooling drum was 20 mm, and the distance between the wire electrode and the cooling drum was 5 mm. As a shielding object, a rectangular polytetrafluoroethylene sheet, 2 mm thick and 20 mm wide, was disposed at a position 7 mm away from the wire electrode along the longitudinal direction of the wire electrode and in a manner such that its surface becomes parallel to the uneven surface on the extrusion surface of the die.

The film production was performed for 3 days, and the results are shown in Table 3.

COMPARATIVE EXAMPLES 1 to 3

Examples 1 to 3 were repeated except that no shielding object was used. The film production was performed for 3 days, and the results obtained are shown in the following table.

| Runs | Average thickness unevenness of the entire product (%) | Number of electrode exchanges (times) | Rate of feasible product (%) |
| --- | --- | --- | --- |
| Example 1 | 2.1 | 0 | 68 |
| Example 2 | 2.3 | 0 | 65 |
| Example 3 | 2.4 | 1 | 68 |
| Comparative Example 1 | 3.1 | 4 | 41 |
| Comparative Example 2 | 3.5 | 3 | 43 |
| Comparative Example 3 | 3.6 | 5 | 35 |

The "average thickness unevenness of the entire product," "number of electrode exchanges," and "rate of feasible product" shown in the above table are defined as follows:

The average thickness unevenness of the entire product is an average of the thickness unevennesses of all film rolls each having a film length of 3000 meters which are measured by a γ-ray thickness tester.

The number of electrode exchanges is the number of exchangings of the wire electrode that were performed during the 3-day operation owing to the poor control of thickness unevenness judged by the responsible operator. Of course, at the time of exchanging, the production was interrupted.

The rate of feasible product is the weight percent of commercially valuable products obtained during the 3-day operation based on the total weight of the starting polymer used.

The tabulated results demonstrate that the present invention affords products of superior quality, and both the rate of operation and the yield of the products are high.

What we claim is:

1. In a process for producing a film of reduced thickness unevenness by extruding a thermoplastic resin from an extrusion die into a film form, exposing the extrudate to an electric field induced by a single electrostaticity applying electrode, and then pinning it to the surface of a cooling drum, the improvement comprising disposing a non-grounded shielding object between the extrusion surface of the die and the electrostaticity applying electrode thereby to maintain the applied voltage constant in the widthwise direction of the extrudate and to enable the extrudate to adhere intimately to the surface of the cooling drum.

2. The process of claim 1 wherein said shielding object is a non-conductive object.

3. The process of claim 1 wherein said shielding object is a combination of a conductive object and a non-conductive object.

4. The process of claim 1 wherein said electrode is shielded from said die extrusion surface by securing said shielding object to a part or the whole of the die extrusion surface.

5. The process of claim 1 wherein said electrode is shielded from said die extrusion surface by disposing said shielding object in the vicinity of said electrode.

6. The process according to claim 1 which further comprises controlling the thickness uniformity of the extruded film by locally heating the thermoplastic resin to thereby change the flow rate of the molten resin in said locally heated area to thereby provide films having a more uniform thickness.

* * * * *